(12) United States Patent
Reed

(10) Patent No.: US 6,513,850 B1
(45) Date of Patent: Feb. 4, 2003

(54) TRUCK BED EXTENSION

(75) Inventor: Harry F. Reed, Scottsdale, AZ (US)

(73) Assignee: Randall C. Reed, Kansas City, MO (US)

( * ) Notice: Subject to any disclaimer, the term of this patent is extended or adjusted under 35 U.S.C. 154(b) by 0 days.

(21) Appl. No.: 09/669,342

(22) Filed: Sep. 26, 2000

Related U.S. Application Data

(63) Continuation-in-part of application No. 09/510,040, filed on Feb. 22, 2000.

(51) Int. Cl.⁷ .............................................. B62D 33/03
(52) U.S. Cl. .................................... 296/26.08; 296/57.1
(58) Field of Search ........................... 296/26.08, 26.09, 296/26.11, 26.1, 57.1, 59; 224/402–404, 488, 492–494; 292/DIG. 29

(56) References Cited

U.S. PATENT DOCUMENTS

| | | | | |
|---|---|---|---|---|
| 4,778,213 A | * | 10/1988 | Palmer | 296/57.1 X |
| 5,004,287 A | * | 4/1991 | Doyle | 296/57.1 |
| 5,658,033 A | * | 8/1997 | Delaune | 296/26.08 |
| 5,707,095 A | * | 1/1998 | Pribak et al. | 292/DIG. 29 |
| 5,755,480 A | * | 5/1998 | Bryan | 296/26.01 |
| 5,820,188 A | * | 10/1998 | Nash | 296/26.11 |
| 5,881,937 A | * | 3/1999 | Sadler | 224/509 |
| 5,997,066 A | * | 12/1999 | Scott | 296/26.08 |

* cited by examiner

Primary Examiner—Dennis H. Pedder
(74) Attorney, Agent, or Firm—Shook, Hardy & Bacon L.L.P.

(57) ABSTRACT

A truck bed extension is provided for extending the useful length of a pickup truck bed. The truck bed extension includes a pair of transversely spaced sidewalls interconnected by a spacing member. The sidewalls each have a forward margin and a lower margin. The forward margins have hardware mimicking that present on the pickup tailgate, so as to permit the sidewalls to couple to the truck bed walls without the need for additional hardware. The lower margins have hardware mimicking that present on the truck bed walls, so as to permit the sidewalls to couple to the tail gate without the need for additional hardware.

15 Claims, 5 Drawing Sheets

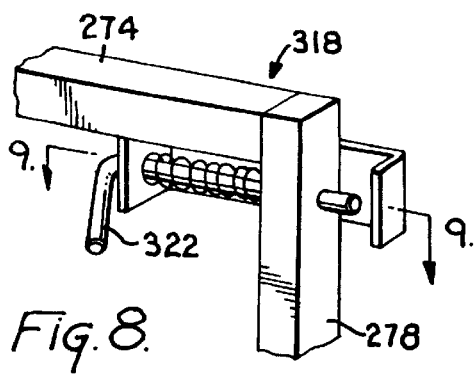
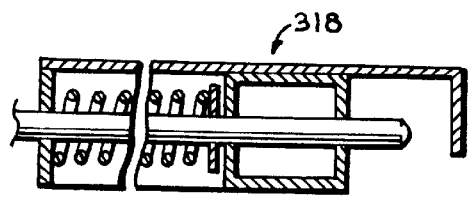
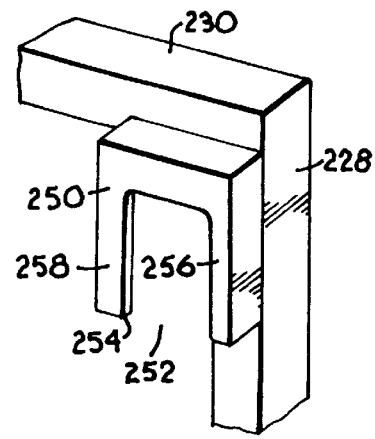
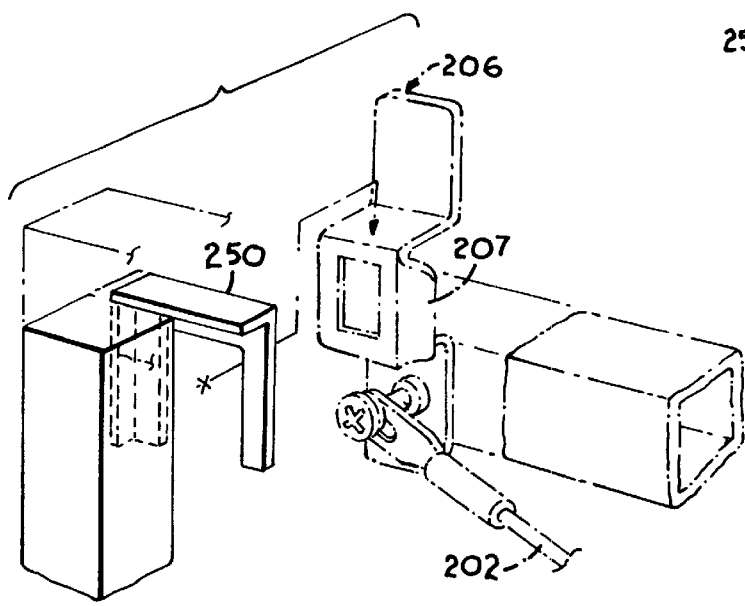
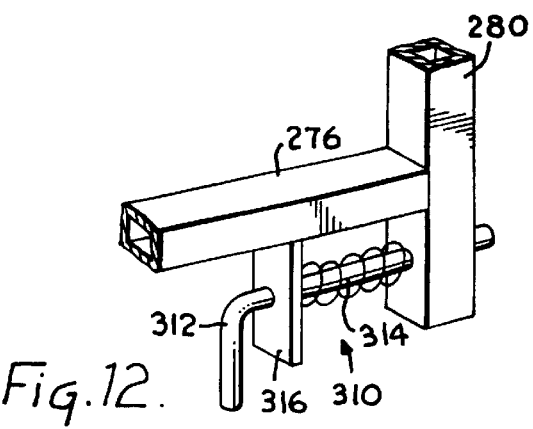

TRUCK BED EXTENSION

RELATED APPLICATION

This is a Continuation in Part of U.S. Ser. No. 09/510,040, filed Feb. 22, 2000 in the name of the same applicant of this application.

BACKGROUND OF THE INVENTION

1. Field of Invention

This invention broadly concerns a truck bed extension which can be readily mounted and detached from a conventional pickup truck bed. More particularly, it is concerned with a truck bed extension which may be coupled to the truck bed and tailgate for increasing the effective length of the truck bed which attaches to the existing tailgate latching hardware without the need for modification.

2. Background of the Invention

Pickup trucks have become a common conveyance for many people in lieu of an automobile. They have the ability to carry cargo and in recent years, many trucks include added passenger seating. In many instances, pickup tuck manufactures wish to avoid increasing either the wheelbase or the overall length of the truck when further seating capacity is added. As a result, the manufacturer often shortens the truck bed of the pickup.

Unfortunately, the result is a reduced cargo-carrying capacity. While traditional pickup truck beds have had a length of about 8 feet in order to carry standard dimensioned lumber and plywood of the length, many current pickup truck bed lengths are reduced to six feet or even four feet. As a consequence, many articles can no longer be successfully transported in the shortened bed.

Several attempts have been made to develop a suitable truck bed extender, and are shown for example in U.S. Pat. Nos. 5,658,033; 5,755,480; 5,816,637 and 5,820,188. However, a problem common to the teaching of each of these designs is their inability to be mounted and readily detached from standard pickup truck beds having latching assemblies, and may require the truck bed to be modified from its existing structure. This detracts from the use of the truck in its manufactured state when no extension is desired. Furthermore, prior art designs lack the combination of secure attachment to both the bed and the tailgate with the need for one-person attachment without the use of tools.

There has thus developed a need for a pickup truck bed extension which can be readily mounted and detached from the bed of a pickup having conventional latching mechanisms. There has further developed a need for a pickup truck bed extension which requires no modification of the truck bed itself, and thus can be used by a pickup truck owner who either lacks the desire or the skills necessary to alter the truck as provided by the manufacturer.

U.S. Ser. No. 09/510,040, of which this is a continuation in part, addresses almost all of these needs—the pickup truck bed extension disclosed therein can be readily mounted and detached from the bed of certain pickups having conventional latching mechanisms, without modification of the truck itself or the addition of hardware. However, the pickup truck bed extension of U.S. Ser. No. 09/510,040 is not suitable for use with all pickup trucks. Pickup trucks manufactured by GMC and Chevrolet, for example, have latching mechanisms that will not accept the pickup truck bed extension of U.S. Ser. No. 09/510,040. A need therefor existed for a pickup truck bed extension adapted to be used with pickup trucks having latching mechanisms that are incompatible with the extension shown in U.S. Ser. No. 09/510,040—and in particular that may be used with pickup trucks of the type manufactured by GMC and Chevrolet.

SUMMARY OF THE INVENTION

These and other objects have been largely met by the truck bed extension of the present invention. That is to say, the truck bed extension hereof can be securely coupled to the existing latching mechanism of a pickup truck bed and tailgate, requires no additional tools, is relatively light in weight and easy to handle, and can be readily mounted and detached without altering the configuration provided by the manufacturer.

The truck bed extension hereof is particularly designed to be mounted on a pickup truck bed having a deck and upright bed walls, including on a pickup truck manufactured by GMC and Chevrolet®. The bed walls include upright and portions at the rear thereof, each end portion mounting opposed, inwardly extending generally horizontal posts. In addition, the tailgate is provided with releasable latches on each side thereof. Thus, in ordinary operation, the tailgate swings on a generally horizontal axis and when upright, the latch mechanisms at each side thereof receive the posts on the bed and hold the tailgate in an upright, closed position. By actuating a handle operatively coupled to the latching mechanisms in the tailgate, the tailgate is released and my be swung downwardly to a generally horizontal orientation, supported by a cable or linkage.

By taking advantage of this relationship, the truck bed extended hereof accomplishes the purposes set forth above. The extender includes a pair of laterally spaced, generally upright sidewalls and a transverse spacing element coupled therebetween. The sidewalls include lower rails which are provided with mating hardware which is positioned and configured for insertion into the latching mechanisms. The mating hardware is positioned on the lower rails so that upright pillars on the sidewalls are adjacent the upright rear portions of the pickup truck bed. U-shaped brackets are positioned on the pillars to receive posts or other hardware mounted on the standards by the manufacturer. The brackets and the mating hardware effectively lock the truck bed extension in place and resist movement thereof in each of three orthogonal axes. The truck bed extension may be quickly removed simply by actuating the handle on the tailgate of the pickup to release the mating hardware and then lifting the brackets off of the hardware extending inwardly from the bed. The truck bed extension preferably includes a safety support to prevent the extension from falling off of the truck during transit, and the extension may have tubular steel, solid or mesh walls, using the tailgate itself as the floor of the extension.

These and other advantages will be readily apparent to those skilled in the art with reference to the drawings and the description which follows.

BRIEF DESCRIPTION OF THE PREFERRED EMBODIMENTS

In accordance with one embodiment of the present invention, a truck bed extension for mounting to a pickup truck is disclosed. The truck bed extension comprises, in combination: first and second substantially upright longitudinally extending sidewalls each having a forward margin and a lower margin; a transversely extending member interconnecting and transversely spacing the sidewalls; mating hardware located proximate the forward margin and dimensioned to couple to hardware located on a truck bed wall; and mating hardware located proximate the lower margin and dimensioned to couple to hardware located on truck tailgate. The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 8 is a perspective view of the rear gate latch of the truck bed extension of FIG. 6.

FIG. 9 is a cross-sectional view of the rear gate latch of FIG. 8, taken along line 9—9.

FIG. 10 is a perspective view of the side bracket of the truck bed extension of FIG. 6, illustrating the mounting of the side bracket onto the truck.

FIG. 11 is a perspective view of the side bracket of the truck bed extension of FIG. 6.

FIG. 12 is a perspective view of the spring-loaded pin at the base of the rear gate of the truck bed extension of FIG. 6.

DETAILED DESCRIPTION OF THE PREFERRED EMBODIMENTS

Figure 1:
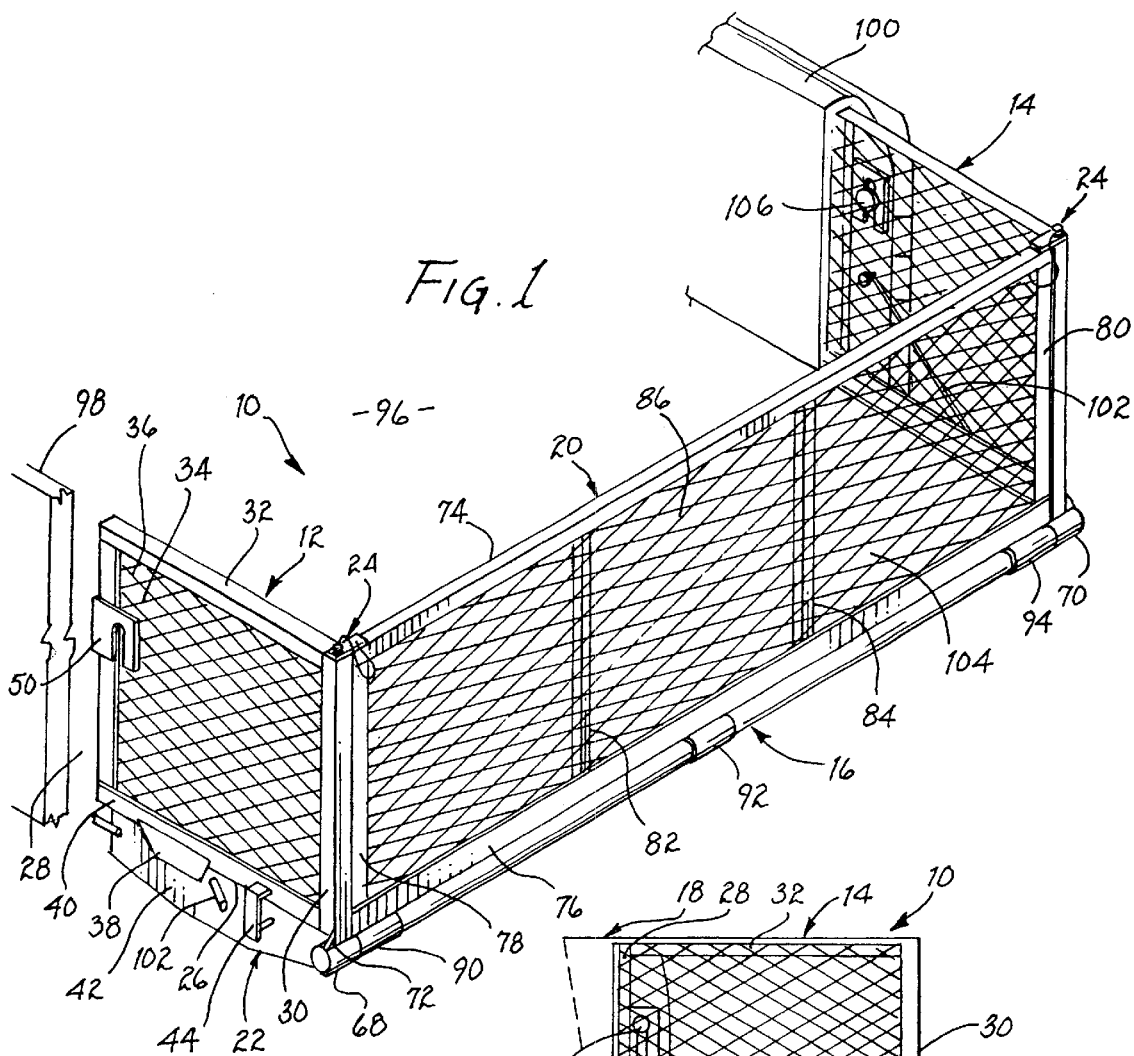
FIG. 1 is a perspective view of the truck bed extension hereof shown mounted to the bed of a pickup truck, the truck bed being shown as a fragmentary diagrammatic view.

Referring now to FIGS. 1–5, one embodiment of a truck bed extension 10 of the present invention broadly includes first and second generally upright sidewalls 12 and 14 which are spaced in parallel planes and connected by a bar 16 which transversely spaces the sidewalls 12 and 14 to lie in generally parallel planes extending rearwardly from a truck bed 18 of a pickup truck. The bar 16 also pivotally mounts a rear gate 20, the bar 16 being positioned to lie preferably rearwardly of the tailgate 22 of the pickup so that the rear gate 20 is free to swing downwardly below the bar 16 without interference from the tailgate 22. A fastening member 24 is provided on the rear gate 20 to releasably couple it to the sidewalls and hold it in a closed, upright position between the sidewalls 12 and 14.

In greater detail, the sidewalls 12 and 14 each include a lower side rail 26 defining a lower sidewall margin, an upright front pillar 28 defining a front sidewall margin, an upright rear pillar 30 defining a rear sidewall margin, an upper side rail 32 defining an upper sidewall margin, and side enclosure 34 to enclose the area within the pillars and the rails of each sidewall 12 and 14. The pillars 28 and 30 and side rails 26 and 32 are preferably provided of tubular steel or aluminum for light weight, ruggedness of construction and the ability to interconnect by welding. Preferably, the pillars and rails will be welded together at their ends, with the enclosure welded thereon to provide a rigid sidewall.

Figure 6:
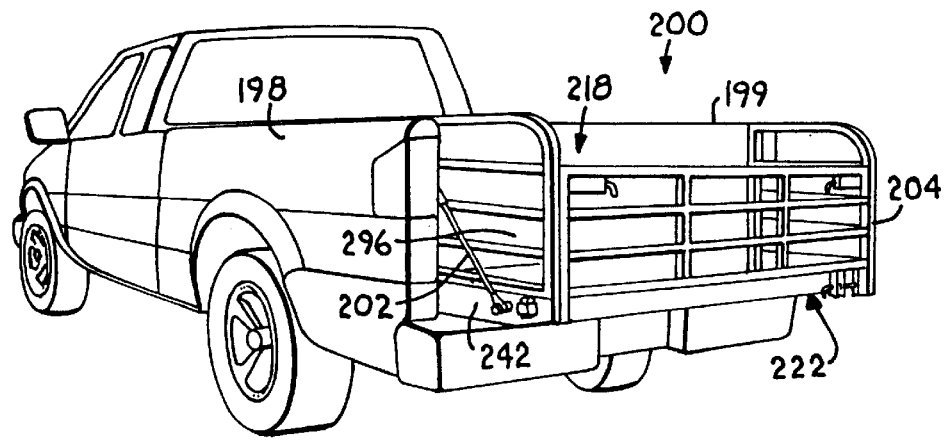
FIG. 6 is a perspective view showing another embodiment of the truck bed extension hereof mounted to the bed of a pickup truck.
Figure 14:
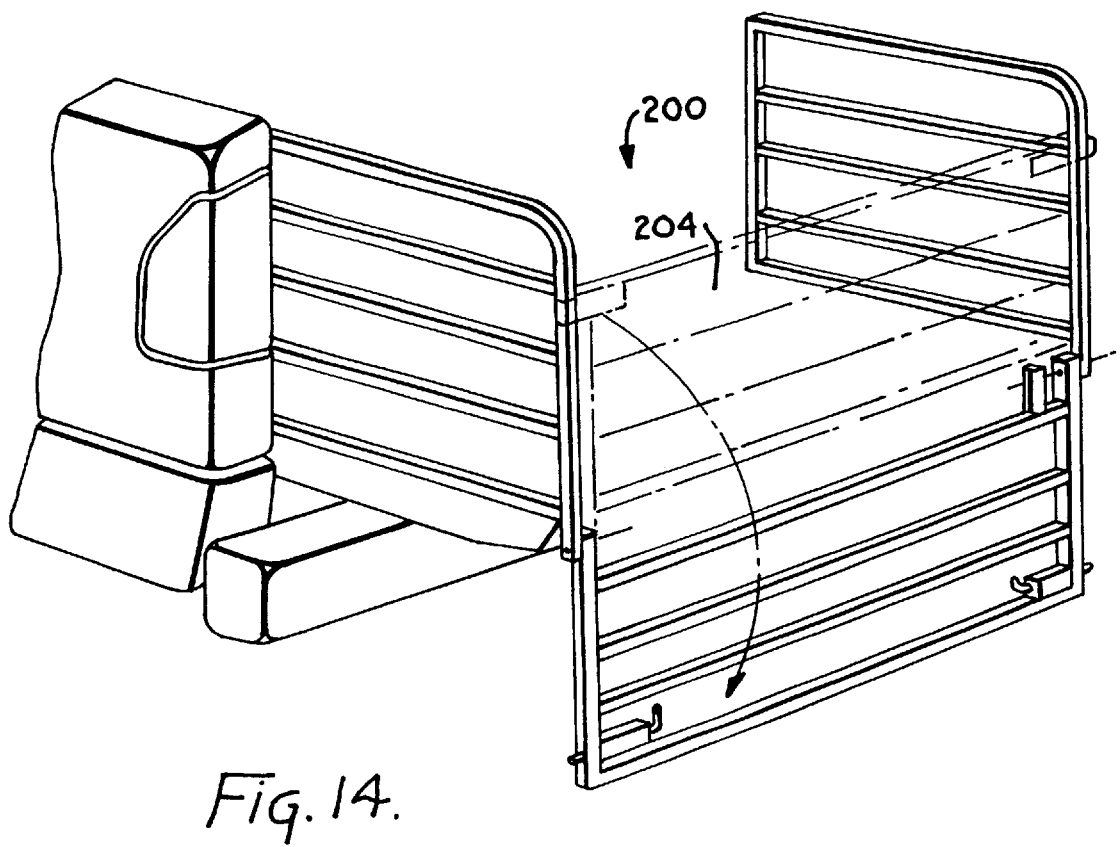
FIG. 14 is a perspective view of the truck bed extension of FIG. 6, with the tail gate in an open position.

The enclosure 34 may be of expanded metal mesh 36, as shown, or alternatively of sheet metal or, as shown below in FIGS. 6, 7 and 14, of tubular steel. The sidewalls each have an outboard side 40. The lower side rail 26 includes a guide flange 38 extending downwardly from the outboard side 40 of each of the lower side rails 26 to engage the sides 42 of the tailgate 22 and resist lateral movement of the truck bed extension 10. Additionally, the lower side rails 26 each carry a downwardly extending L-shaped mount 44 which include an inwardly extending pin 46. Thus, the pin 46 of sidewall 12 will be opposite and extend toward the pin 46 of the sidewall 14, and the pin 46 of sidewall 14 will be opposite and extend toward the pin 46 of sidewall 12. The pins 46 of each sidewall 12 and 14 thus are substantially co-linear and lie in a substantially horizontal plane when the truck be bed extension is mounted, each pin 46 including a terminal flange 48 to aid in preventing slippage of the pin 46 when mounted to the tailgate 22.

The front pillars 28 of each sidewall 12 and 14 include a U-shaped side bracket 50 on the outboard side 40 thereof. The brackets 50 thus present a slot 52 open at its lower end 54, with the brackets 50 on each sidewall 12 and 14 being positioned to lie in the same, substantially horizontal plane. The brackets 50 thus include a front leg 56 and a rear leg 58 which inhibit front and rear movement of the truck bed extension 10 when mounted.

The rear pillars 30 of each sidewall 12 and 14 include a hole 60 in the upper end 62 thereof. The fastening member 24 includes a pin-like bolt 64 attached by a wire 66 to the rear gate 20, with the bolt 64 removably received in the hole 60 to hold the rear gate 20 in a closed position. A mounting bracket 65 is attached to the rear gate 20 and provided with an aperture which is in registry with the hole 60 when the rear gate 20 is in an upright, closed position, whereby bolt 64 may secure the mounting bracket to the rear pillars of the respective sidewalls.

The bar 16 is preferably a tubular steel cylinder having a circular outer surface with end caps 68 and 70 welded thereto. A gusset plate 72 is welded to each cap and its corresponding rear pillar 30 to provide additional reinforcement and rigidity and to maintain the sidewalls 12 and 14 in an upright orientation.

The rear gate 20 includes upper beam 74 and lower beam 76 positioned in spaced-apart, substantially parallel planes. The beams 74 and 76 are interconnected by side stanchions 78 and 80 respectively adjacent the side walls 12 and 14, and optional additional support is provided by intermediate braces 82 and 84. The beams 74 and 76 are welded to the side stanchions 78 and 80 and also to the braces 82 and 84, with a back enclosure 86 provided to inhibit material received in the truck bed from passing rearwardly therepast. To minimize air resistance when the truck is in motion, the back enclosure 86 may be of expanded metal mesh 36 as shown, but alternatively the back enclosure may be provided as a sheet metal panel or may be of tubular steel. The rear gate 20 is preferably swingably mounted to the bar 16 by circular bearings 90, 92 and 94 which are welded onto the lower beam 76 at laterally spaced intervals.

Figure 2:
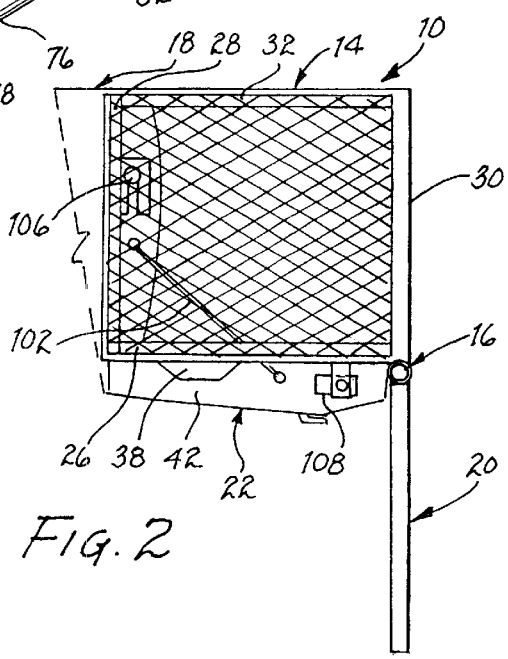
FIG. 2 is a side elevational view showing the truck bed and tailgate to which the truck bed extension is mounted.
Figure 3:
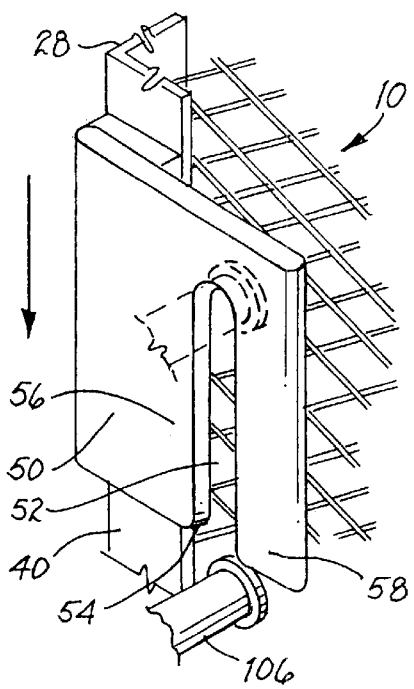
FIG. 3 is an enlarged, fragmentary perspective view showing the mounting bracket on the truck bed extension receiving a post which extends inwardly from the bed wall of the truck.
Figure 4:
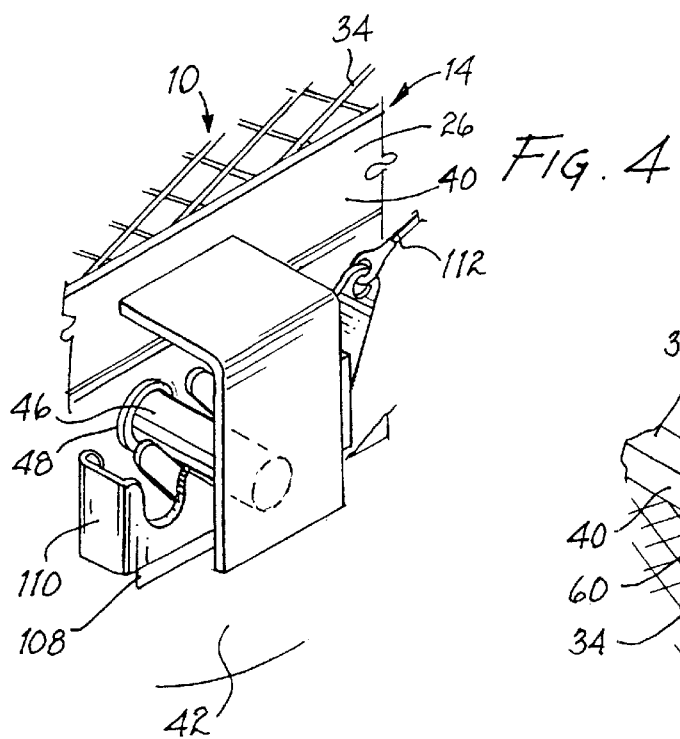
FIG. 4 is an enlarged, fragmentary perspective view showing the pin extending inwardly from a mount which extends downwardly from the lower side rail of the truck bed extension sidewalls.
Figure 5:
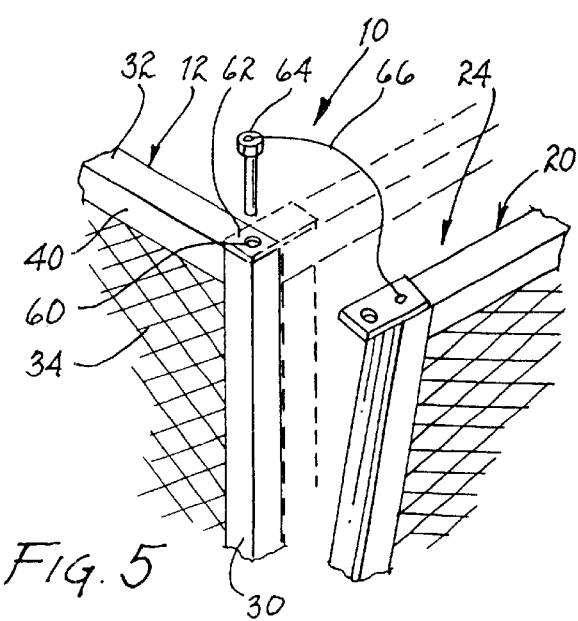
FIG. 5 is an enlarged, fragmentary perspective view showing the rear gate of the truck bed extension and the fastening member for holding it in position.

The truck bed extension 10 hereof is especially designed to be mounted to a pickup truck bed 18 having a generally horizontal deck 96 and a pair of spaced apart bed walls 98 and 100. The bed 18 includes hinges which swingably mount the tailgate 22 for movement about a generally horizontal axis. At least one of the bed walls 98 and 100 are typically connected to the tailgate 22 by a retainer, such as a cable 102 or arm, which maintains the tailgate 22 in a generally horizontal position when opened as shown in FIG. 2. In this position, the interior wall 104 of the tailgate 22 is substantially co-planar with the deck 96 of the truck bed.

In certain vehicles, the bed walls 98 and 100 each include, at a predetermined location on the rear portions thereof, opposed, inwardly extending posts 106, preferably with terminal flanges. The posts 106 are sized, configured and located to slide into openings 108 in respective sides of the tailgate 22, the openings 108 each having latches 110 positioned therein to receive the posts 106 when the tailgate 22 is closed by swinging it into a generally vertical position. The latches 110 are thus positioned at a predetermined position on the tailgate to cooperate with the posts 106. The tailgate 22 is typically provided with a shiftable handle which is operatively coupled to the latches 110 by an arm, cable 112 or the like. Thus, the user lifts or otherwise shifts the handle to open the latches 110 which permits opening of the tailgate 22.

The truck bed extension 10 hereof advantageously positions the brackets 50 and the pins 46 to hold the extension onto the tuck bed. The brackets 50 are positioned on the front pillars 28 so that the lower side rails are proximate to or supported by the tailgate 22, the posts 106 received in the slots 521, and the pins 46 releasably coupled to the latches 110. In this position, the bar 16 is positioned just rearwardly and below the interior wall 104 of the tailgate 22. In this position, with the rear gate swung downwardly in an open position, cargo received on the deck 96 of the truck bed can slide rearwardly across the tailgate 22 without interference by the bar 16. Additionally, the sidewalls 12 and 14 extend rearwardly from the recessed rear portions of the truck bed 18 and in overlapping relationship, the front pillars 28 essentially occupying the space within the recessed rear portions of the truck bed where the tailgate 22 originally connected to the bed walls 98 and 100. The attachment of the truck bed extension 10 is simplified by the fact that only vertical movement of the extension 10 onto the truck bed 18 is required. With the tailgate 22 open to serve as the floor of the extension 10, lowering of the brackets 50 onto the posts 106 while the pins 46 are lowered and locked onto the latches 110 completes the mounting operation. Removal of the extension 10 requires only that the handle on the tailgate 22 be pulled to cause the cable 112 or the like to trip the latch release lever and thereby permit the spring loaded receiver to pivot, thereby opening the latches to free the pins 46 and enable lifting of the extension in a vertical direction. This can be accomplished by one person when a hoist or pulley system is attached to the extension as an aid to raising and lowing.

When mounted to the truck bed 18, the sidewalls 12 and 14 extend rearwardly and lie in substantially the same upright parallel planes as the bed walls 98 and 100. Thus, without the necessity of additional fittings or hardware being permanently coupled to the tuck bed 18, its length can be functionally extended for temporary periods, with the advantage that it can be quickly returned to its original condition without any holes or permanent modifications.

Referring now generally to FIGS. 6–14, an extension 200 representing another embodiment of the present invention is shown. The extension 200 broadly includes first and second generally upright sidewalls 212 and 214 and a rear gate 220. The first and second generally upright sidewalls 212 and 214 are dimensioned to be connected by the rear gate 220 which transversely spaces the sidewalls 212 and 214 to lie in generally parallel planes extending rearwardly from a truck bed 218 of a pickup truck.

In greater detail, the sidewalls 212 and 214 each include a lower side rail 226 defining a lower sidewall margin, an upright front pillar 228 defining a front sidewall margin, a substantially L-shaped pillar 230 defining a rear and upper sidewall margin, and side bars 234 to enclose the area within the pillars and the rails of each sidewall 212 and 214. The pillars 228 and 230, side rail 226, and side bars 234 are preferably provided of tubular steel or aluminum for light weight, ruggedness of construction and the ability to interconnect by welding. (Alternatively, the side rails 226 may be replaced with expanded metal mesh as shown above in FIGS. 1–2, or with sheet metal.) Preferably, the pillars, rails, and bars will be welded together at their ends.

The sidewalls each have an outboard side 240. The lower side rails 226 each includes a guide flange 238 extending downwardly from the outboard side 240 to engage the sides 242 of the tailgate 222 and resist lateral movement of the truck bed extension 200. Additionally, the lower side rails 226 each carry a downwardly extending tongue 244, which includes a four-sided opening 246 therein. Still further, the lower side rails 226 include a safety chain and clasp 227, which can be coupled to the tailgate 222 so as to prevent the truck bed extension 200 from accidentally falling off of the truck during transit.

The front pillars 228 of each sidewall 212 and 214 include a U-shaped side bracket 250 on the outboard side 240 thereof. The brackets 250 thus present a slot 252 open at its lower end 254, with the brackets 250 on each sidewall 212 and 214 being positioned to lie in the same, substantially horizontal plane. The brackets 250 thus include a front leg 256 and a rear leg 258 which inhibit front and rear movement of the truck bed extension 200 when mounted. Additionally, the front pillars 228 of each sidewall 212 and 214 each includes a guide flange 239 extending forward from the outboard side 240 to engage the interior portions of the truck bed walls 198 and 199.

Each L-shaped pillar 230 includes a hole 260 in the area of the upper rear sidewall margin and a hole 261 in the area of the lower rear sidewall margin on the inboard side 241 of the L-shaped pillars 230. As discussed below, the holes 260 and 261 are positioned to permit the attachment of the rear gate 200 to the sidewalls 212 and 214.

Turning now to the rear gate 220, it includes an upper beam 274 and lower beam 276 positioned in spaced-apart, substantially parallel planes. The beams 274 and 276 are interconnected by side stanchions 278 and 280 respectively adjacent the side walls 212 and 214, and optional additional support is provided by intermediate braces 282 and 284. The beams 274 and 276 are welded to the side stanchions 278 and 280 and also to the braces 282 and 284. Horizontal bars 279 enclose the area within the side stanchions 278 and 280. The pillars 228 and 230, side rail 226, and side bars 234 are preferably provided of tubular steel or aluminum for light weight, ruggedness of construction and the ability to interconnect by welding. (Alternatively, the horizontal bars 279 may be replaced with expanded metal mesh as shown above in FIGS. 1–2, or with sheet metal.)

The rear gate 220 is preferably removably and swingably mounted to the side walls 212 and 214. In this regard, the rear gate 220 features on side stanchion 278 an outwardly projecting pin 300, located so as to be insertable into and rotatable within hole 261 (not shown) on the first upright sidewall 212. Referring specifically to FIG. 7, on side stanchion 280 is located a spring loaded latching assembly 310, comprising an L-shaped pin 312, a spring 314 attached on one end to the L-shaped pin 312 and on a second end to the side stanchion 280 so as to maintain the L-shaped pin 312 in a closed position, and a mount 316 through which the L-shaped pin 312 is passed, so as to maintain the L-shaped pin 312 in proper alignment so that it may enter the hole 261 in the second upright sidewall 214.

Figure 7:
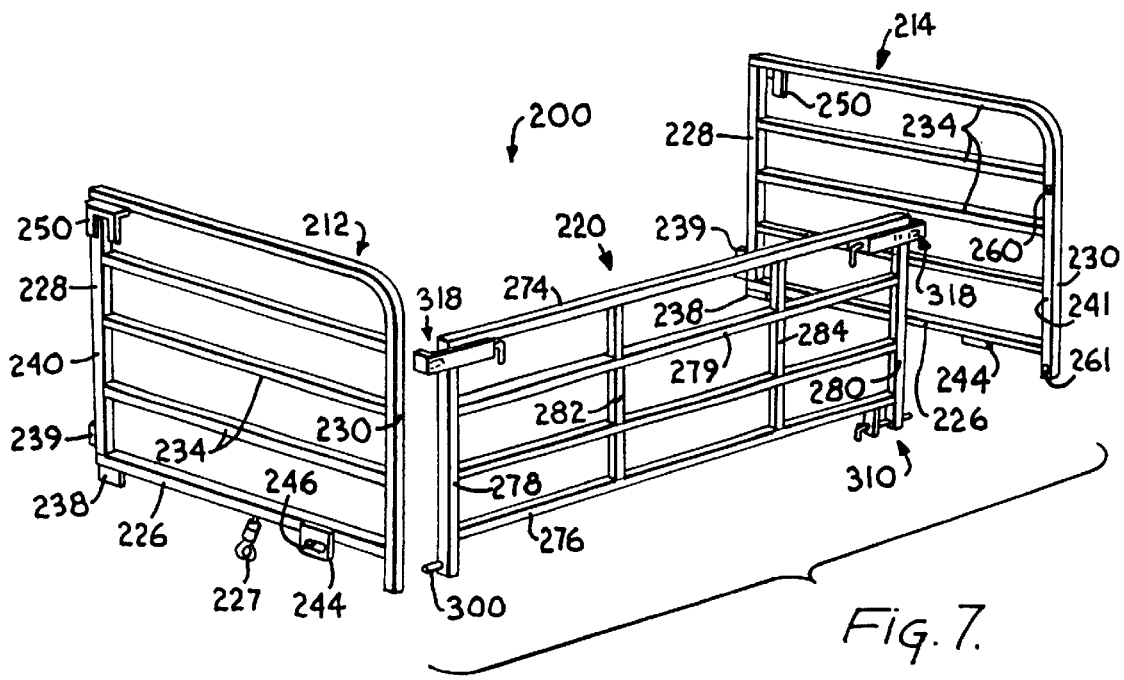
FIG. 7 is a perspective, exploded view of the truck bed extension of FIG. 6.
Figure 13:
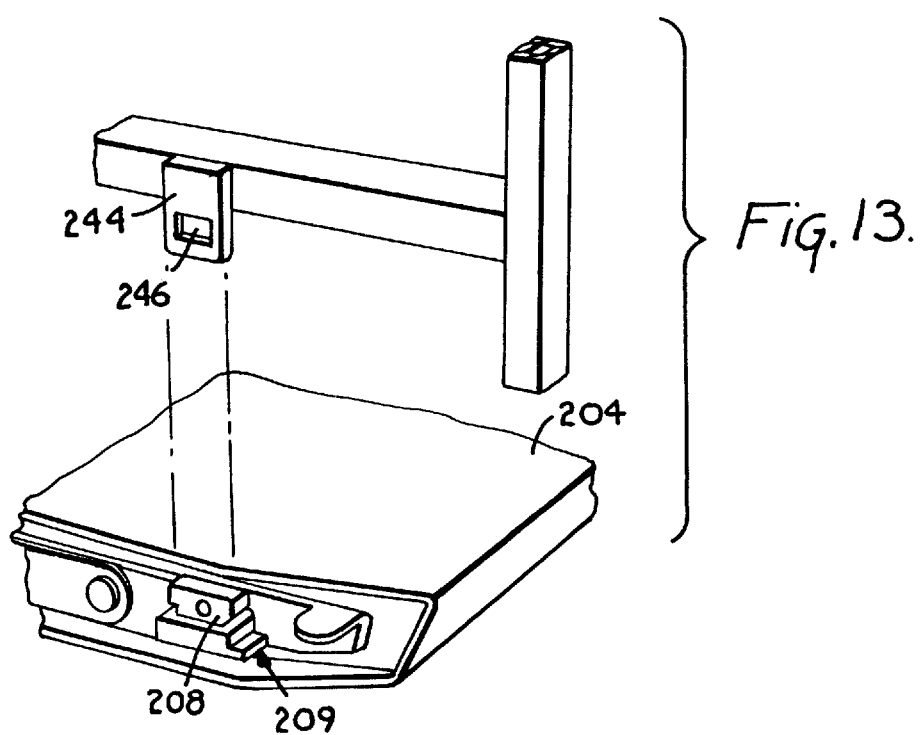
FIG. 13 is a perspective view showing the mating hardware at the base of one of the side walls of the truck bed extension of FIG. 6 and its insertion into the tailgate.

Referring now to FIGS. 7–9, latching assemblies 318 are shown. The latching assemblies 318 are each coupled to an upper corner portion of the rear gate 220. Each latching assembly 318 comprises a U-shaped mount 320 coupled to each of beam 274 and a side stanchion (278 or 280), and extending beyond the side stanchion so as to be able to clasp the outboard side 240 of the L-shaped pillar 230 when the rear gate 220 is attached to the sidewalls 212 and 214 and placed in a closed position. The latching assemblies 318 further comprise an L-shaped pin 322, a spring 324 attached on one end to the L-shaped pin 322 and on a second end to the side stanchion 280 so as to maintain the L-shaped pin 322 in a closed position. The latching assemblies 318 are positioned so that the L-shaped pins 322 may be inserted into holes 260.

When it is desired to mount the rear gate 220 to the side walls 212 and 214, the outwardly projecting pin 300 is inserted into hole 261 in side wall 212. Thereafter, the short leg of the L-shaped pin 312 is grasped and pulled in the direction of the side wall 212, so as to open the latching assembly 310. The side stanchion 280 is then moved into position along pillar 230 of side wall 214 on the inboard side 241 thereof, with the L-shaped pin 312 aligned with hole 261. Once proper alignment is achieved, the L-shaped pin 312 may be released so that it will enter hole 261. At this point, the bottom portion of the rear gate 220 is connected to the side walls 212 and 214.

The rear gate 220 may be secured in a closed position in the following manner. The short legs of the L-shaped pins 322 are grasped and pulled away from the nearest side stanchion 278 or 280, so as to open the latching assemblies 318. The side stanchions 278 and 280 are then moved into position along pillars 230 of side walls 212 and 214 on the inboard side 241 thereof, with the L-shaped pins 322 aligned with holes 260. Once proper alignment is achieved, the L-shaped pins 322 may be released so that they will enter holes 260.

The truck bed extension 200 hereof, like the extension 10, is especially designed to be mounted to a pickup truck bed 218 having a generally horizontal deck and a pair of spaced apart bed walls 198 and 199. The truck bed extension 200 differs from the extension 10 in that the truck bed extension 200 is specifically adapted to be coupled to a truck bed 218 of the type on GMC and Chevrolet pickup trucks, the tailgate hardware of which will not mate with the hardware on the extension 10.

The bed 218 includes hinges which swingably mount the tailgate 222 for movement about a generally horizontal axis. At least one of the bed walls 98 and 100 are typically connected to the tailgate 222 by a retainer, such as a cable 202 or arm, which maintains the tailgate 222 in a generally horizontal position when opened as shown in FIG. 6. In this position, the interior wall 204 of the tailgate 222 is substantially co-planar with the deck 296 of the truck bed.

In certain pickup trucks manufactured by GMC and Chevrolet, the bed walls 198 and 199 each include, at a predetermined location on the rear portions thereof, opposed, inwardly extending male coupling devices 206, having a flange 207 (see FIG. 10) projecting rearward at a ninety degree angle in the direction of the tailgate 222. The male coupling devices 206 and flanges 207 are sized, configured and located so that the flanges 207 slide into openings 208 in female coupling devices 209 in respective sides of the tailgate 222, the female coupling devices 209 each having latches (not shown) positioned therein to receive the flanges 207 when the tailgate 222 is closed by swinging it into a generally vertical position. The female coupling devices 209 are thus positioned at a predetermined position on the tailgate 222 to cooperate with the male coupling devices 206. The tailgate 222 is typically provided with a shiftable handle which is operatively coupled to the latches (not shown) in the female coupling devices 209 by an arm, cable or the like. Thus, the user lifts or otherwise shifts the handle to open the latches which permits opening of the tailgate 222.

The truck bed extension 200 hereof advantageously positions the brackets 250 and the extending tongue 244 (including its four-sided opening 246) to hold the extension onto the tuck bed. The brackets 250 are positioned on the male coupling devices 206 (see FIG. 10) so that the lower side rails are proximate to or supported by the tailgate 222, and the extending tongues 244 are releasably coupled to the female coupling devices 209 through the openings 208. In this position, the bottom portions of pillars 230 and side stanchions 278 and 280 extend beyond the top of the tailgate 222. In this position, with the rear gate 220 swung downwardly in an open position, cargo received on the deck 296 of the truck bed can slide rearwardly across the tailgate 222 without interference by the rear gate 220. Additionally, the sidewalls 212 and 214 extend rearwardly from the recessed rear portions of the truck bed 218, the front pillars 228 essentially occupying the space within the recessed rear portions of the truck bed where the tailgate 222 originally connected to the bed walls 198 and 199.

The attachment of the truck bed extension 200 is simplified by the fact that only vertical movement of the extension 200 onto the truck bed 218 is required. With the tailgate 222 open to serve as the floor of the extension 200, lowering of the brackets 250 onto the male coupling devices 206 while the extending tongues 244 are lowered and locked into the female coupling devices 209 through the openings 208 completes the mounting operation. Removal of the extension 200 requires only that the handle on the tailgate 222 be pulled to cause the cable (not shown) or the like to trip the latch release lever and thereby opening the latches to free the extending tongues 244 and enable lifting of the extension in a vertical direction. This can be accomplished by one person when a hoist or pulley system is attached to the extension as an aid to raising and lowing.

When mounted to the truck bed 218, the sidewalls 212 and 214 extend rearwardly and lie in substantially the same upright parallel planes as the bed walls 198 and 199. Thus, without the necessity of additional fittings or hardware being permanently coupled to the tuck bed 218, its length can be functionally extended for temporary periods, with the advantage that it can be quickly returned to its original condition without any holes or permanent modifications.

The truck bed extensions 10 and 200 share in common that they provide a truck bed extension capable of being mounted to a pickup truck without the need for installing additional hardware, with hardware on the forward margin of the sidewalls of the truck bed extension mimicking hardware on the tail gate and hardware on the lower margin of the sidewalls mimicking hardware on the truck bed walls to allow the truck bed extension to take advantage of the existing pickup truck hardware for coupling. Thus, it will be understood that, although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention. Most obviously, as necessary to conform to the hardware on a particular pickup truck design, the mating hardware on the truck bed extension (on the forward and lower margins of the sidewalls) can be changed so as to conform to a particular pickup truck's bed wall and tail gate hardware, so as to permit the coupling of the truck bed extension to the pickup truck without additional hardware.

Other changes are also possible. For example, the rear gate could be mounted to swing horizontally instead of vertically, the fastening member could be a clasp or padlock, and the side walls and rear gate could be molded of synthetic resin, glass reinforced resin, carbon fiber or other lightweight and rigid materials.

The inventors hereby states his intent to reply on the Doctrine of Equivalents to determine and assess the reasonably fair scope of his invention as pertains to any apparatus not materially departing from but outside the literal scope of the invention as set out in the following claims.

I claim:

1. A truck bed extension for mounting to a pickup truck having a tailgate with an interior wall, comprising:

first and second substantially upright longitudinally extending sidewalls for coupling the extension to the tailgate, each of said sidewalls having a front margin, a lower margin and a pillar, wherein said pillar includes a bottom portion extending below the interior wall of the tailgate when the tailgate is in the open position; and a rear gate transversely spacing said sidewalls and swingably coupled with said sidewalls proximate said bottom portions of said pillars, said rear gate being swingable between a generally upright, closed position and a generally downward, open position so that when said rear gate is in the open position, cargo can slide across the tailgate without contacting said rear gate.

2. The truck bed extension of claim 1, wherein said sidewalls include mating hardware located proximate said front margin of said sidewalls comprising a substantially U-shaped bracket dimensioned to couple to hardware located on the truck.

3. The truck bed extension of claim 1, wherein said sidewalls include mating hardware located proximate said lower margin of said sidewalls comprising a downward extending tongue having a bounded, four-sided opening therethrough dimensioned to releasably lock into hardware located on the tailgate.

4. The truck bed extension of claim 1, further comprising a safety support coupling said truck bed extension to said truck.

5. The truck bed extension of claim 4, wherein said safety support is a chain and clasp mounted to at least one said lower margin.

6. The truck bed extension of claim 1, further comprising:

a pin rigidly coupled with said rear gate for insertion into an aperture in said bottom portion of said first sidewall; and a spring-loaded latching assembly coupled with said rear gate, said spring-loaded latching assembly having a moveable pin for insertion into an aperture in said bottom portion of said second sidewall so that said rigidly coupled pin and said spring-loaded latching assembly cooperate to swingably and releasably couple said rear gate with said sidewalls.

7. The truck bed extension of claim 2, wherein said mating hardware further comprises a front guide flange for engaging the truck.

8. The truck bed extension of claim 3, wherein said mating hardware further comprises a lower guide flange for engaging the tailgate and thereby resist lateral movement of the truck bed extension.

9. A truck bed extension for mounting to a pickup truck having a tailgate with an interior wall, comprising:

first and second substantially upright longitudinally extending sidewalls for engaging the tailgate, each of said sidewalls having a front margin and a lower margin;

a rear gate transversely spacing said sidewalls and swingably coupled with said sidewalls, said rear gate being swingable between a generally upright, closed position and a generally downward, open position;

mating hardware located proximate said front margin of said sidewalls comprising a substantially U-shaped bracket and dimensioned to couple to hardware located on the truck; and mating hardware located proximate said lower margin of said sidewalls comprising a downward extending tongue having a bounded, four-sided opening therethrough and dimensioned to releasably lock into hardware located on the tailgate;

wherein said mating hardware located proximate said front margin of said sidewalls further comprises a front guide flange for engaging the truck.

10. A truck bed extension for mounting to a pickup truck having a tailgate with an interior wall, comprising:

first and second substantially upright longitudinally extending sidewalls for engaging the tailgate, each of said sidewalls having a front margin and a lower margin;

a rear gate transversely spacing said sidewalls and swingably coupled with said sidewalls, said rear gate being swingable between a generally upright, closed position and a generally downward, open position;

mating hardware located proximate said front margin of said sidewalls comprising a substantially U-shaped bracket and dimensioned to couple to hardware located on the truck;

mating hardware located proximate said lower margin of said sidewalls comprising a downward extending tongue having a bounded, four-sided opening therethrough and dimensioned to releasably lock into hardware located on the tailgate;

a pin rigidly coupled with said rear gate for insertion into an aperture in said first sidewall; and a spring-loaded latching assembly coupled with said rear gate having a moveable pin for insertion into an aperture in said second sidewall so that said rigidly coupled pin and said spring-loaded latching assembly cooperate to swingably and releasably couple said rear gate with said sidewalls.

11. A truck bed extension for mounting to a pickup truck having a tailgate with an interior wall, comprising:

first and second substantially upright longitudinally extending sidewalls for coupling the extension to the tailgate, each of said sidewalls having an aperture;

a rear gate transversely spacing said sidewalls;

a pin rigidly coupled with said rear gate for insertion into the aperture in said first sidewall; and a spring-loaded latching assembly coupled with said rear gate having a moveable pin for insertion into the aperture of said second sidewall so that said rigidly coupled pin and said spring-loaded latching assembly cooperate to swingably and releasably couple said rear gate with said sidewalls.

12. The truck bed extension of claim 11, wherein said sidewalls include mating hardware located proximate a front margin of said sidewalls comprising a U-shaped bracket dimensioned to couple to hardware located on the truck.

13. The truck bed extension of claim 11, wherein said sidewalls include mating hardware located proximate a lower margin of said sidewalls comprising a downward extending tongue having a bounded, four-sided opening therethrough dimensioned to releasably lock into hardware located on the tailgate.

14. The truck bed extension of claim 12, wherein said mating hardware further comprises a front guide flange for engaging the truck.

15. The truck bed extension of claim 13, wherein said mating hardware further comprises a lower guide flange for engaging the tailgate and thereby resist lateral movement of the truck bed extension.

* * * * *